(12) United States Patent
Berry et al.

(10) Patent No.: US 11,456,693 B2
(45) Date of Patent: Sep. 27, 2022

(54) SMART ELECTRIC MOTOR WITH DECOUPLED MULTIPLE WINDINGS

(71) Applicant: SAFRAN ELECTRICAL & POWER, Blagnac (FR)

(72) Inventors: Olivier Berry, Blagnac (FR); José Soler, Blagnac (FR); Jérémy Cuenot, Blagnac (FR); Sonia Dhokkar, Blagnac (FR)

(73) Assignee: SAFRAN ELETRICAL & POWER, Blagnac (FR)

( * ) Notice: Subject to any disclaimer, the term of this patent is extended or adjusted under 35 U.S.C. 154(b) by 0 days.

(21) Appl. No.: 17/299,923

(22) PCT Filed: Dec. 2, 2019

(86) PCT No.: PCT/FR2019/052894
§ 371 (c)(1),
(2) Date: Jun. 4, 2021

(87) PCT Pub. No.: WO2020/115416
PCT Pub. Date: Jun. 11, 2020

(65) Prior Publication Data
US 2022/0069757 A1    Mar. 3, 2022

(30) Foreign Application Priority Data

Dec. 5, 2018  (FR) ....................... 1872384

(51) Int. Cl.
*H02H 7/08*    (2006.01)
*H02P 29/028*  (2016.01)
(Continued)

(52) U.S. Cl.
CPC ............ *H02P 29/028* (2013.01); *H02P 25/22* (2013.01); *H02P 27/06* (2013.01); *B64D 27/24* (2013.01); *H02P 2207/05* (2013.01)

(58) Field of Classification Search
CPC ....... H02P 29/028; H02P 25/022; H02P 27/06
(Continued)

(56) References Cited

U.S. PATENT DOCUMENTS 9,906,183 B1 *  2/2018  Agirman ................. H02P 27/08
2011/0316461 A1  12/2011  Rippel
(Continued)

FOREIGN PATENT DOCUMENTS

CN    1761130 A1   4/2006
EP    3367556 A1   8/2018

OTHER PUBLICATIONS

International Search Report and Written Opinion in corresponding Application No. PCT/FR2019/052894, dated Feb. 17, 2020, (11 pages).

*Primary Examiner* — Erick D Glass
(74) *Attorney, Agent, or Firm* — Bookoff McAndrews, PLLC (57) ABSTRACT

A smart motor having a permanent magnet synchronous machine and an electronic control unit, the synchronous machine including one or two permanent magnet rotor(s) and at least one six-phase stator per rotor endowed with at least two three-phase assemblies each formed of three windings electrically coupled in a star, the electronic control unit including one control inverter per stator equipped with six independent arms each configured to control one phase of a six-phase stator. The three-phase assemblies are magnetically and electrically decoupled with respect to one another.

20 Claims, 4 Drawing Sheets (51) Int. Cl.
    *H02P 25/22*     (2006.01)
    *H02P 27/06*     (2006.01)
    *B64D 27/24*     (2006.01)

(58) Field of Classification Search
    USPC .................................................... 318/400.21
    See application file for complete search history.

(56) References Cited

U.S. PATENT DOCUMENTS

| | | | |
|---|---|---|---|
| 2012/0187893 A1* | 7/2012 | Baba | H02P 25/024 |
| | | | 318/722 |
| 2016/0036308 A1 | 2/2016 | Bailey et al. | |
| 2017/0117834 A1* | 4/2017 | Fujii | H02P 21/24 |
| 2017/0267103 A1* | 9/2017 | Nomura | H02P 29/027 |
| 2017/0353083 A1 | 12/2017 | Shrestha et al. | |
| 2020/0304049 A1* | 9/2020 | Li | H02M 7/5395 |
| 2020/0328639 A1* | 10/2020 | Takahashi | H02K 1/2786 |

\* cited by examiner

SMART ELECTRIC MOTOR WITH DECOUPLED MULTIPLE WINDINGS

CROSS-REFERENCE TO RELATED APPLICATION(S)

This application is the U.S. national phase entry under 35 U.S.C. § 371 of International Application No. PCT/FR2019/052894, filed on Dec. 2, 2019, which claims priority to French Patent Application No. 1872384, filed on Dec. 5, 2018.

TECHNICAL FIELD

The invention relates to a smart electric motor, particularly for an aircraft, and more particularly to the electrical architecture of an electric motor with multiple decoupled windings with strong mechanical integration.

BACKGROUND

Vertical takeoff and landing aircraft are used more and more, particularly in intra-urban and inter-urban transportation of merchandise or of persons.

The revolution in aerial transport has given birth to a growing need for the propulsion of the new aircraft, VTOL ("Vertical Take-Off and Landing") for example. Electrical energy is the main vector of this revolution, due to its flexibility of implementation, its efficiency (only the necessary energy is produced), its reliability (limited maintenance) and mainly by the potential reduction in mass and volume which it generates relative to a conventional propulsion system (thermal with hydraulic or pneumatic energy distribution). On the other hand, the current power of on-board electric motors does not allow competition with the power developed by a single heat engine; it is therefore necessary to multiply the number of electric motors.

It is therefore easy to understand that the mechatronic integration constraints (mass and volume) of the electric motor, controller (power electronics and control electronics), filtering and cooling system assembly is a key problem of this change, particularly for preserving a propulsion assembly of which the mass and the bulk remain small.

A smart motor architecture is known endowed with a gearbox and with a plurality of independent windings in which each winding is powered by an H bridge converter, but the input filtration is not integrated. The presence of a gearbox in the smart motor generates a degradation of the reliability of the motor and an increase in maintenance operations.

Also known is a motor with multiple stator windings with a topology of an electromechanical converter comprising an annular stator facing, in the axial direction, one or two annular rotors, the stator including a plurality of windings and the rotor, permanent magnets. The motor has an electrical architecture including two groups of three windings electrically coupled in a star, but the neutral conductor of which is common to both groups.

Also known is a smart motor including two groups of three windings electrically coupled in a star, but in which the two star-connected groups are simultaneously wound in each case on a single tooth, which couples them magnetically at least. In this configuration, the neutral conductors of the two groups are electrically connected so as to have a common point electrically and to balance the currents. This configuration is relatively low in cost in terms of production.

This configuration however, does not allow electrical and magnetic isolation between the two star-connected groups.

DISCLOSURE OF THE INVENTION

The invention aims to provide an architectural smart motor solution, without a gearbox, allowing both improving the power per unit mass of the motor for applications requiring a motor that is lightweight, powerful and including its power and control electronics and guaranteeing the provision of the mechanical torque both in the event of a breakdown of the voltage inverter arm of one star of a stator as in the case of a breakdown of one of the stators.

In a first object of the invention, a smart motor is proposed comprising a permanent magnet synchronous machine and an electronic control unit, the synchronous machine including one or two permanent magnet rotor(s) and at least one six-phase stator per rotor endowed with at least two three-phase assemblies each formed from three windings electrically coupled in a star, and preferably from a first three-phase assembly formed of three first windings electrically coupled in a star and from a second three-phase assembly formed of three second windings electrically coupled in a star. Said electronic control unit of the synchronous machine includes one control inverter per stator equipped with six independent arms each configured to control one phase of a six-phase stator.

According to a general feature of the first object of the invention, the two star-connected assemblies of windings are magnetically and electrically decoupled from one another.

The electrical and magnetic isolation of the two three-phase winding assemblies with respect to one another allows eliminating the interphase inductances.

For a given six-phase stator, the magnetic and electrical decoupling of the two star-connected winding assemblies allows making the first set of windings independent of the second set of windings. This independence between the two sets of windings offers the smart motor in particular the possibility of operating in a degraded mode in which only one of the sets of windings operates with the associated inverter arms following a breakdown of at least one of the inverter arms of the other set of windings for example.

In another example of a smart motor endowed with two six-phase stators and with a rotor, the magnetic and electrical decoupling of the six-phase stators further allows making the first stator independent of the second stator. This independence between the two stators offers the smart motor in particular the possibility of operating in a degraded mode in which only a single stator operates, following a breakdown of the other stator for example.

The smart motor mentioned above with reference to the prior art and including two sets of three winding electrically coupled in a star has in particular a neutral conductor common to the two sets of windings. This configuration does not allow having electrical or magnetic isolation between the two star-connected assemblies.

In the smart motor according to the invention, the two star-connected assemblies are wound successively and not simultaneously, which takes more time than simultaneous winding but allows having magnetic and electrical decoupling. The balancing of the currents is accomplished by the means of only winding each set of windings. The winding must therefore be more accurate than in the configuration where the two sets of windings are wound simultaneously, and the control of the windings must also be more accurate.

Not connecting the neutral conductors allows leaving more freedom in control and therefore allowing the degraded mode.

Preferably, the smart motor is lacking a gearbox inside its housing, the housing or casing accommodating the synchronous machine and the control unit. This allows achieving a gain in volume and in mass, as well as a gain in reliability and in maintenance.

Advantageously, said at least one stator of the electrical machine can comprise a ring gear, each winding of the three-phase assemblies being wound around a single tooth of the ring gear.

The stator, or each stator, can thus comprise a ring gear, each of the first windings and of the second windings being wound around a single tooth of the ring gear, which allows minimizing the size of the stator, particularly the size of the winding head.

The rotor, or each of the two rotors, can advantageously include magnets positioned in a Halbach array which allows increasing the torque per unit mass of the smart motor.

Preferably, the stator or each stator of said electrical machine can be divided into distinct angular ranges, the number of angular ranges of a stator corresponding to the number of three-phase assemblies of the stator, the angular range extending over an angle corresponding to the result of the division of 360° by the number of three-phase assemblies of the stator.

The first windings of the first assembly are thus positioned in a first angular range of the stator extending over 180 mechanical degrees and the second windings of the second assembly can be positioned over a second angular range of the stator extending over 180 mechanical degrees, the first angular range being distinct from the second range.

The first set of windings and the second set of windings are therefore positioned on two distinct portions of the perimeter of a circle. This allows maximizing the magnetic decoupling and facilitates electrical isolation between the two sets of windings.

Advantageously, the control unit can further include a current regulation module in each set of windings, independently of the other set of windings, and a rotor speed regulation winding.

The control unit is configured to operate with or without a mechanical position sensor. The mechanical positions sensor gives the angular mechanical position of the rotor on which the sensor is mounted. This allows the control unit to have this position information to be able to regulate the currents in the two sets of windings of the six-phase stator.

When the position sensor is not mounted or when the position information issued by the sensor is lost, a position estimation method is implemented by the regulation module of the control unit to provide the function of regulating currents in the two windings of the six-phase stator.

The electronic control unit can further advantageously comprise a connection interface connecting a DC high voltage power supply bus to each of the six arms of the inverter and including a state including a capacitive decoupling state equipped with differential mode capacitors.

Advantageously, the smart motor can further comprise, for each inverter arm, a power electronics board on which is mounted said electronic control unit, electronic protection elements of the inverter, at least one means of measuring phase current and a means of measuring voltage of the DC high voltage bus.

This configuration broken into a plurality of power electronics boards allows optimizing the volume occupied by the power electronics boards, for example by placing them around the connection interface, which further allows bringing them closer to the cooling device and maximizing the cooling of the power boards when the cooling device is mounted on the periphery of the smart motor.

Preferably, the smart motor further comprises flexible links between the connection interface and each of the power electronics boards.

Advantageously, the synchronous machine can comprise a plurality of stators and a rotor common to the plurality of stators, each stator being magnetically and electrically independent from the others.

The synchronous machine can advantageously comprise at least four stators and a first and a second rotor, the first rotor being common to the stators of a first set of at least two stators, the second rotor being common to the stators of a second set of at least two stators, the stators of the first set being distinct from the stators of the second set, and each stator being magnetically and electrically independent from the others.

BRIEF DESCRIPTION OF THE DRAWINGS

The invention will be better understood upon reading the following, by way of indication but without limitation, with reference to the appended drawings in which.

DESCRIPTION OF THE EMBODIMENTS

Figure 1:
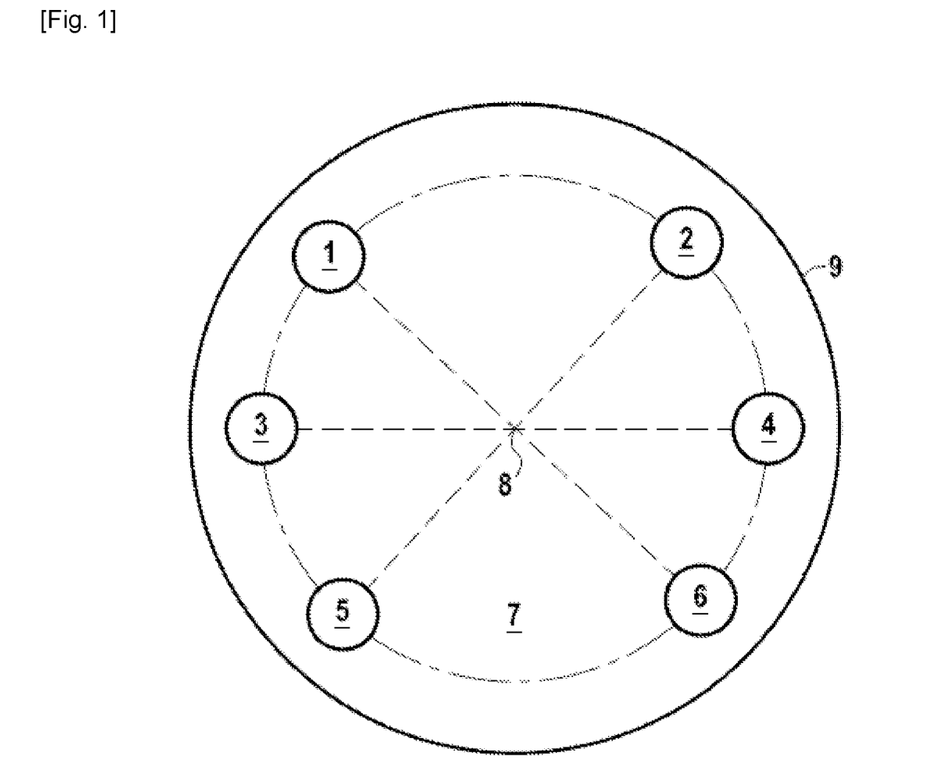
FIG. 1 shows schematically a multi-rotor aircraft equipped with a propulsion system according to one embodiment of the invention.

A multi-rotor aircraft 7 is shown schematically in FIG. 1, equipped with a propulsion system 9 according to one embodiment of the invention. In the example illustrated in FIG. 1, the propulsion system 9 comprises six rotors 1 to 6 distributed over the multi-rotor phantom line circle. The rotors 1 to 6 form three pairs of rotors, the rotors of the same pair being symmetrically opposed with respect to a center of symmetry 8. The first pair of rotors comprises rotors 1 and 6, the second pair of rotors comprises rotors 2 and 5, the third pair of rotors comprises rotors 3 and 4. In addition, the propulsion system 9 comprises one smart motor 10 for each rotor 1 to 6.

Figure 2:
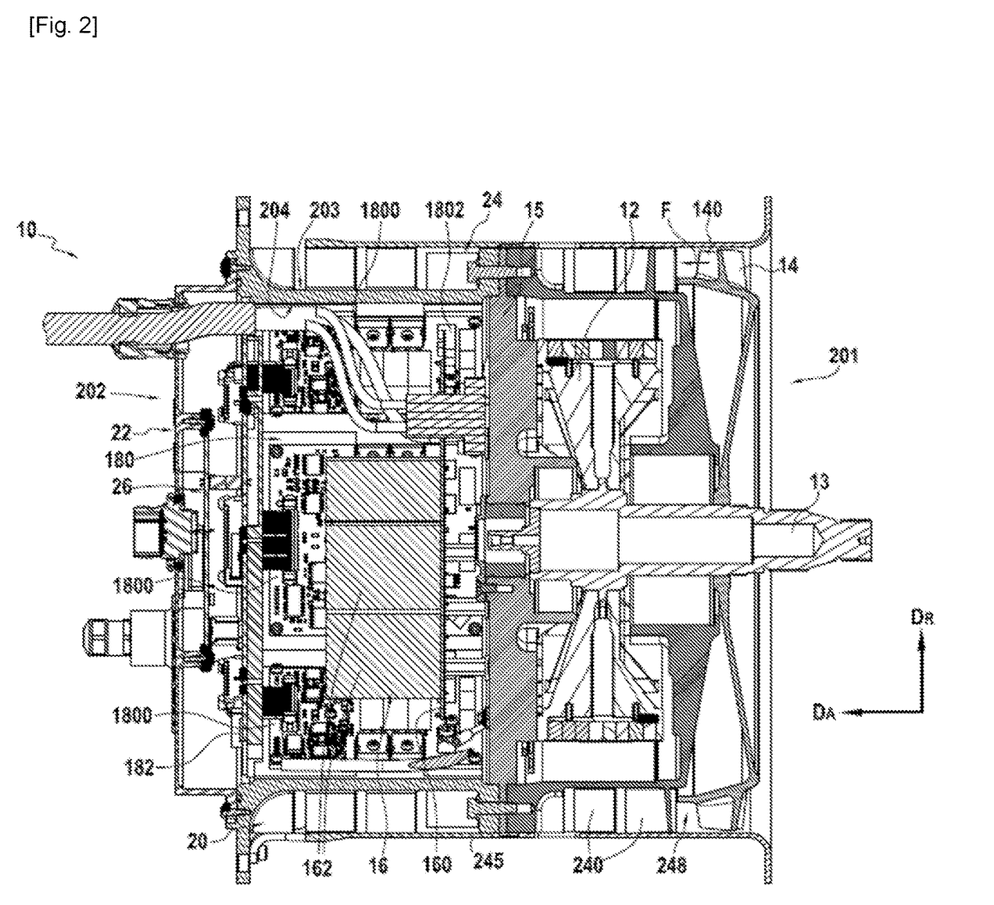
FIG. 2 shows schematically a section view of a smart motor of the propulsion system of FIG. 1, according to a first embodiment of the invention.

A section view of a smart motor 10 is shown schematically in FIG. 2, according to a first embodiment of the invention.

The smart motor 10 illustrated in FIG. 2 comprises an electrical machine 12 acting as an electromechanical converter and endowed with a rotating portion defining an axial direction $D_A$ and a radial direction $D_R$. FIG. 2 is a section view in a plane comprising the axial direction $D_A$ and the radial direction $D_R$.

The smart motor 10 further comprises an impeller 14, electrical filtering means 16, an electronic control unit 18, and a housing 20 or casing, inside which are accommodated the electrical machine 12, the electronic control unit 18 and the filtering means 16.

The impeller 14 is mechanically coupled to the electrical machine 12 by a transmission shaft 13, which allows the electrical machine to drive the impeller 14.

The housing 20 has a hollow cylindrical shape with, in the embodiment illustrated in FIG. 2, a circular cross section. The axis of revolution of the housing 20 is congruent with the axis of rotation $D_A$ of the electrical machine 12 which is congruent with the axis of rotation of the transmission shaft 13 and of the impeller 14.

The housing 20 comprises, in the axial direction $D_A$, a first end 201 and a second end 202 opposite to the first end 201. In the axial direction $D_A$, the housing 20 is closed at its first end 201 by the impeller 14, and at its second end 202 by a cover 22.

The housing 20 comprises a cooling device 24 mounted on a radially external surface 203 of the housing 20. The terms "internal" and "external," and "interior" and "exterior" are used here with reference to the radial direction $D_R$ in the smart motor 10.

The cooling device 24 comprises a set of fins 240 extending radially outward from the radially external surface 203 of the housing 20, and thus forms a radiator allowing heat exchange between the fins 240 and a flow F of air crossing the fins 240 of the cooling device 24. The flow F of cooling air is generated and fed by the blades 140 of the impeller 14 driven by the electrical machine 12, and is thus self-maintained.

In the embodiment illustrated in FIG. 2, the cooling device 24 further comprises a cylindrical cooling casing 245 positioned around the cooling fins 240. The cooling casing 245 thus defines, with the radially external surface 203 of the housing 20, a cooling stream 248 in which the cooling air flow F is channeled.

In one variant, the smart motor could not comprise impellers and cooling casings in order to reduce the mass of the smart motor. The smart motor would then be cooled by the flow of air generated by the rotor of the aircraft, the rotor conventionally consisting of a propeller mechanically connected directly to the mechanical rotation shaft of the smart motor.

In the embodiment illustrated in FIG. 2, which shows a so-called "axial" configuration of the smart motor 10 according to the invention, the smart motor 10 comprises a housing 20 including a cooling device, a driving portion including the electrical machine 12, the impeller 14 and the transmission shaft 13, and an electronic portion separated in the axial direction from the driving portion, the electronic portion comprising in particular the electrical filtering means 16 and the control unit 18.

To physically separate the driving portion and the electronic portion, the smart motor 10 comprises an internal wall 15 extending in a radial plane comprising the radial direction $D_R$ and orthogonal to the axial direction $D_A$ and attached to a radially internal surface 204 of the housing 20. The electrical machine 12 is positioned inside the housing 20 upstream of the internal wall 15, while the electrical filtering means 16 and the electronic control unit 18 of the electronic portion are positioned downstream of the internal wall 15.

The terms "upstream" and "downstream" are used here with reference to the direction of flow of cooling air delivered, shown by the arrow F in FIG. 2.

The electronic control unit 18 comprises a static electrical converter 180 configured to power the electrical machine 12.

The electrical converter 180 is placed directly following the electrical machine 12 in the housing 20 of the smart motor 10, which allows reducing the length of the electrical connections between the electrical converter 180 and the electrical machine 12 passing through the internal wall 15 and thus dispense with interphase inductances.

The electrical converter 180 comprises, in the embodiment illustrated in FIG. 2, six power electronics boards 1800 arranged together to form a hollow cylinder with a hexagonal base coaxial with the electrical machine 12.

In a variant in which the electrical converter would comprise eight electronic boards, it would form a cylinder with an octagonal base. If it comprised five electronic boards, it would form a cylinder with a pentagonal base. In a variant in which the electrical converter would comprise a single electronic board, it could form a hollow cylinder with a circular base with a power electronics board having an annular shape, possibly with a first end and a second end facing one another in a direction orthogonal to the radial direction $D_R$ and to the axial direction $D_A$.

The electronic boards 1800 are positioned facing the internal surface 204 of the housing 20 to maximize cooling of the electronic power components.

The filtering means 16 comprise an electronic filtering board 160 on which are mounted capacitors 162.

In the embodiment illustrated in FIG. 2, the electronic filtering board 160 of the filtering means 16 has a hexagonal shape allowing its insertion into the hollow cylinder formed by the electronic boards 1800 of the electronic converter 180. The hexagonal shape of the electronic board 160 cooperates with the hexagonal cross section of the hollow cylinder formed by the power electronic boards 1800 of the electrical converter 180, which allows adjusting the electronic filtering board 160 as close as possible to the electronic power boards 1800. The capacitors 162 and the electronic board 160 are accommodated in the hollow cylinder of the electrical converter 180.

Each electronic board 1800 of the electrical converter 180 comprises at least one connection terminal 1802 extending in a radial plane comprising the radial direction $D_R$ and orthogonal to said axial direction $D_A$ allowing electrically connecting the electronic filtering board 160 to the power electronic boards 1800 of the electrical converter 180. Each connection terminal 1802 includes a corrugated portion which provides it with elasticity which allows offering a certain freedom of movement to the electronic filtering board 160 with respect to the electrical converter 180. The integration of the electrical filtering in the housing closest to the perturbing elements, such as the power switches of the electronic power boards 1800, allow reducing the cabling inductances and thus reducing the mass and the volume of the filtering.

In addition, the electronic control unit 18 comprises an electronic control board 182 configured to control the operation of the electrical machine 12. In the embodiment illustrated in FIG. 2, the electronic control board 182 comprises a hexagonal shape extending in a radial plane comprising the radial direction $D_R$ and orthogonal to the axial direction $D_A$ and parallel to the filtering board 160.

The smart motor 10 further comprises an electronic supervision board 26 accommodated inside the housing 20 and in communication with the electronic control board 182. The electronic supervision board extends in a radial plane comprising the radial direction $D_R$ and orthogonal to the axial direction $D_A$ and parallel to the filtering board 160. The electronic supervision board 26 is positioned facing the cover 22, between the cover 22 and the electronic control board 182.

In this axial configuration, the cooling device 24 is communalized between the electrical machine 12 and the electronic portion of the smart motor 10 comprising the filtering means 16 and the electronic control unit 18. The flow F of cooling air delivered by the blades 140 of the impeller 14 circulates along the radially external surface 203 of the housing 20 and fluidly communicates with the fins 240 of the cooling device 24. The radially external surface 203 of the housing 20 recovers both the heat generated by the electrical machine 12 and the heat generated by the electronic portion, particularly by the power converter 180, and transfers the calories to the flow F of cooling air, particularly via the fins 240, the air flow F then exhausting the calories outside the smart motor 10.

Figure 3:
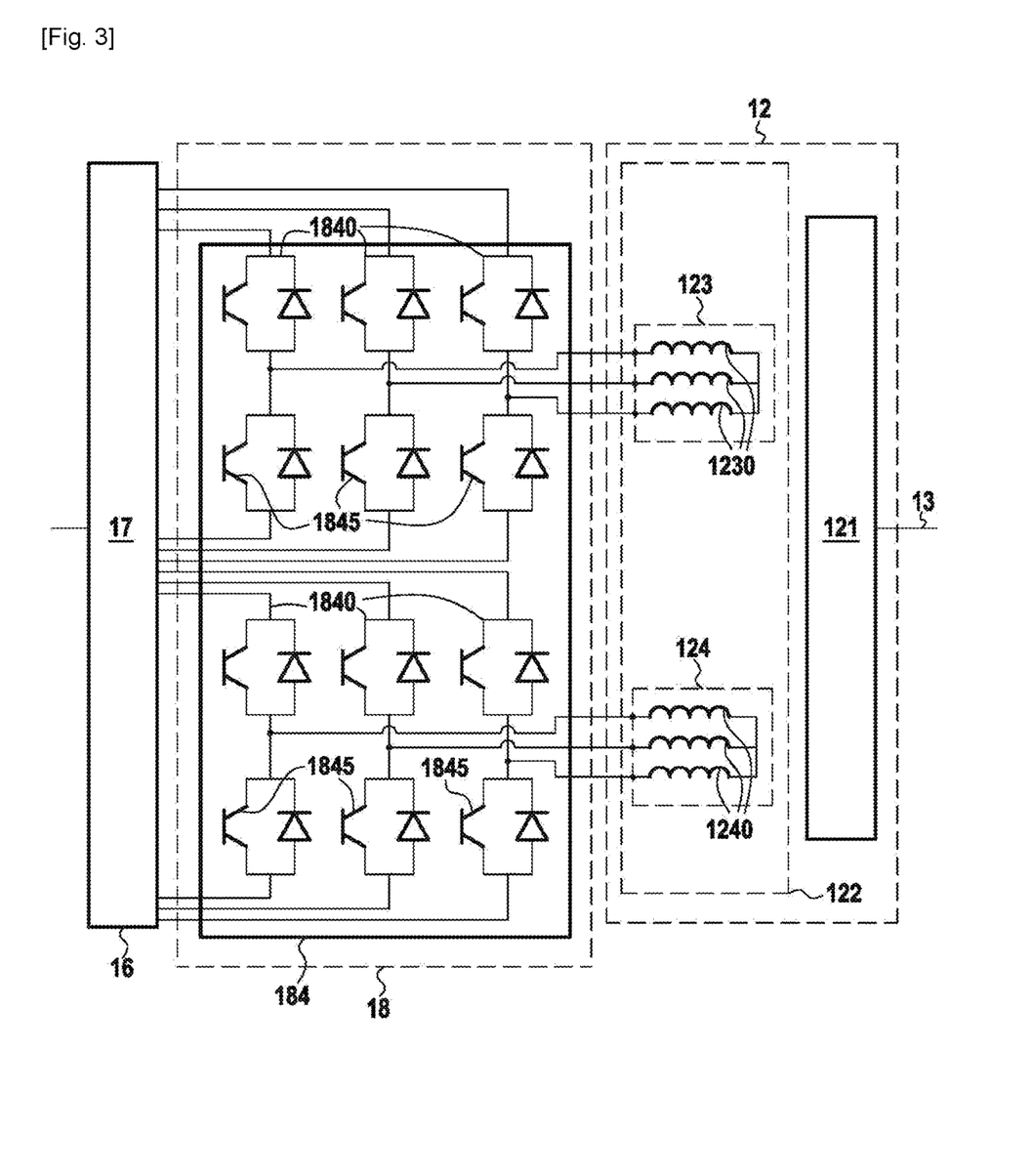
FIG. 3 is a schematic view of the electrical architecture according to a first embodiment of the electrical machine of the smart motor of FIG. 2.

As illustrated in FIG. 3, the electrical machine 12 of the smart motor 10 is a synchronous machine including a permanent magnet rotor 121 and a six-phase stator 122 endowed with a first three-phase assembly 123 of three first windings 1230 electrically coupled in a star and a second three-phase assembly 124 of three second windings 1240 electrically coupled in a star.

The electronic control unit 18 of the synchronous machine 12 includes a control inverter 184 equipped with six independent arms 1840 each configured to control one phase of the six-phase stator of the electrical machine 12. The two three-phase assemblies 123 and 124 of star-connected windings are magnetically and electrically decoupled from one another.

To have a first and a second three-phase assemblies 123 and 124 electrically and magnetically independent of one another, the windings 1230 of the first three-phase star-connected assembly 123 are wound, then the windings 1240 of the second three-phase star-connected assembly 124 are wound following the winding of the windings 1230 of the first three-phase assembly 123.

The stator 122 comprises a ring gear. Each of the first windings 1230 and of the second windings 1240 is wound around a single tooth of the ring gear, which allows minimizing the size of the stator 122, particularly the size of the head of each of the windings 1230 and 1240.

The rotor 121 includes magnets positioned in a Halbach array to increase the torque per unit mass of the smart motor 10.

The first windings 1230 of the first three-phase assembly 123 are positioned over a first angular range of the stator extending over 180 mechanical degrees and the second windings 1240 of the second assembly 124 are positioned over a second angular range of the stator extending over 180 mechanical degrees. The first angular range is distinct from the second angular range, the angular range thus covering a half-circle, which allows maximizing the magnetic decoupling and facilitating the electrical isolation between the two three-phase assemblies 123 and 124.

The electronic control unit 18 further includes a current regulation module in each three-phase assembly 123 and 124, and a rotor speed regulation module 121.

The smart motor 10 also comprises a connection interface 17 connecting a DC high voltage power supply bus to each of the six arms 1840 of the inverter 184 of the electronic control unit 18. The connection interface 17 includes filtering means 16 produced in the form of a capacitive decoupling stage equipped with differential mode capacitors. In the embodiment illustrated in FIG. 2, the connection interface 17 is congruent with the electronic filtering board 160.

In the embodiment illustrated in FIG. 3, each power electronic board 1800 comprises power transistors 1845, electronic protection elements of the inverter 184, a phase current sensor and a voltage sensor of the DC high voltage bus.

Figure 4:
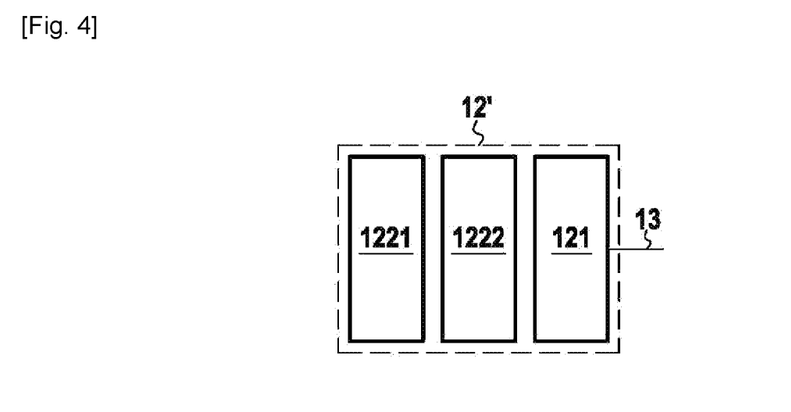
FIG. 4 shows schematically an electrical architecture according to a second embodiment of the electrical machine of the smart motor of FIG. 2.

Illustrated in FIG. 4 is an electrical machine 12' according to a second embodiment of the invention. In the second embodiment of the electrical machine 12', the synchronous machine 12' comprises two stators 1221 and 1222 and a rotor 121 common to the two stators 1221 and 1222.

Each stator 1221 and 1222 is magnetically and electrically independent of the other stator 1222 and 1221. And each stator 1221 and 1222 comprises a first three-phase assembly of windings independent of a second three-phase assembly of windings.

Figure 5:
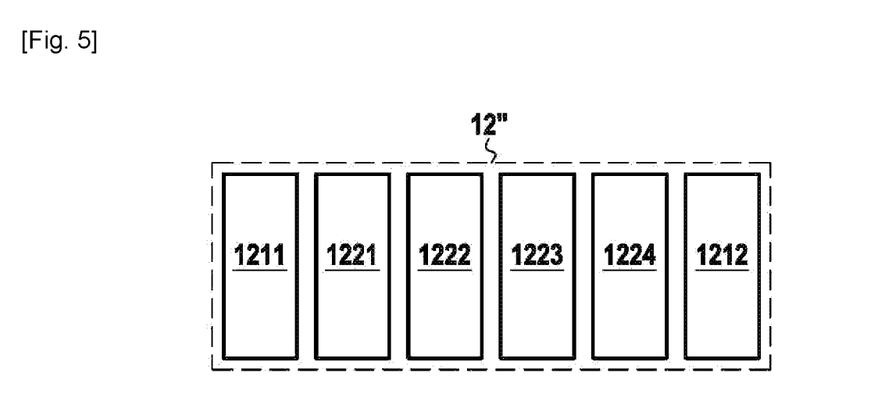
FIG. 5 shows schematically an electrical architecture according to a third embodiment of the electrical machine of the smart motor of FIG. 2.

In FIG. 5 is illustrated an electrical machine 12" according to a third embodiment of the invention. In the third embodiment of the electrical machine 12", the synchronous machine 12" comprises four stators 1221, 1222, 1223 and 1224 and a first and a second rotor 1211 and 1212. The first rotor 1211 is common to the two first stators 1221 and 1222, and the second rotor 1212 is common to the two second stators 1223 and 1224, the two first stators 1221 and 1222 being distinct from the two second stators 1223 and 1224, and each stator being magnetically and electrically independent from the others.

The invention thus provides an architectural smart motor solution allowing both improving the power per unit mass of the motor for applications necessitating a lightweight and powerful motor including its power and control electronics, and guaranteeing the provision of the mechanical torque:
- in the event of a voltage inverter arm breakdown of a star of a stator for a smart motor, either with a single stator configuration or with a multiple stator configuration with double rotors, or
- in the event of a breakdown of one of the stators for a smart motor with a multi-stator configuration with a rotor or with a multi-stator configuration with double rotors.

The invention claimed is:

1. A smart motor comprising a permanent magnet synchronous machine and an electronic control unit, the synchronous machine including one or two permanent magnet rotor(s) and at least one six-phase stator per rotor endowed with at least two three-phase assemblies each formed of three windings electrically coupled in a star, said electronic control unit including one control inverter per stator equipped with six independent arms each configured to control one phase of the stator, the stator being divided into distinct angular ranges, the number of angular ranges of the stator corresponding to the number of three-phase assemblies of the stator, the angular range extending over an angle corresponding to the result of the division of 360° by the number of three-phase assemblies of the stator, wherein said three-phase assemblies are magnetically and electrically decoupled with respect to one another.

2. The smart motor according to claim 1, wherein said at least one stator of the electrical machine comprises a ring gear, each winding of the three-phase assemblies being wound around a single tooth of the ring gear.

3. The smart motor according to claim 1, wherein the rotor(s) include magnets in a Halbach array.

4. The smart motor according to claim 1, wherein the electronic control unit further includes a current regulation module configured to regulate the current in each three-phase assembly independently of the other three-phase assembly, and a rotor speed regulation module.

5. The smart motor according to claim 1, further comprising a connection interface connecting a DC high voltage power supply bus to each of the six arms of the inverter of the electronic control unit, the connection interface including a capacitive decoupling stage equipped with differential mode capacitors.

6. The smart motor according to claim 5, further comprising, for each inverter arm, a power electronics board on which are mounted power transistors, electrical protection elements of the power transistors, means of measuring phase current and means of measuring voltage of the DC high voltage bus.

7. The smart motor according to claim 6, further comprising flexible links between the connection interface and each of the power electronics boards.

8. The smart motor according to claim 1, wherein the synchronous machine comprises a plurality of stators and a rotor common to the plurality of stators, each stator being magnetically and electrically independent of the others.

9. The smart motor according to claim 1, wherein the synchronous machine comprises at least four stators and first and second rotors, the first rotor being common to the stators of a first set of at least two stators, the second stator being common to the stators of a second set of at least two stators, the stators of the first set being distinct from the stators of the second set and each stator being magnetically and electrically independent from the others.

10. A smart motor comprising a permanent magnet synchronous machine and an electronic control unit, the synchronous machine including one or two permanent magnet rotor(s) that include magnets in a Halbach array and at least one six-phase stator per rotor endowed with at least two three-phase assemblies each formed of three windings electrically coupled in a star, said electronic control unit including one control inverter per stator equipped with six independent arms each configured to control one phase of the stator,
wherein said three-phase assemblies are magnetically and electrically decoupled with respect to one another.

11. The smart motor according to claim 10, wherein said at least one stator of the electrical machine comprises a ring gear, each winding of the three-phase assemblies being wound around a single tooth of the ring gear.

12. The smart motor according to claim 10, wherein the electronic control unit further includes a current regulation module configured to regulate the current in each three-phase assembly independently of the other three-phase assembly, and a rotor speed regulation module.

13. The smart motor according to claim 10, further comprising a connection interface connecting a DC high voltage power supply bus to each of the six arms of the inverter of the electronic control unit, the connection interface including a capacitive decoupling stage equipped with differential mode capacitors.

14. The smart motor according to claim 13, further comprising, for each inverter arm, a power electronics board on which are mounted power transistors, electrical protection elements of the power transistors, means of measuring phase current and means of measuring voltage of the DC high voltage bus.

15. The smart motor according to claim 14, further comprising flexible links between the connection interface and each of the power electronics boards.

16. A smart motor comprising a permanent magnet synchronous machine and an electronic control unit, the synchronous machine including one or two permanent magnet rotor(s) and at least one six-phase stator per rotor endowed with at least two three-phase assemblies each formed of three windings electrically coupled in a star, said electronic control unit including one control inverter per stator equipped with six independent arms each configured to control one phase of the stator, the electronic control unit further including:
a current regulation module configured to regulate the current in each three-phase assembly independently of the other three-phase assembly, and
a rotor speed regulation module,
wherein said three-phase assemblies are magnetically and electrically decoupled with respect to one another.

17. The smart motor according to claim 16, wherein said at least one stator of the electrical machine comprises a ring gear, each winding of the three-phase assemblies being wound around a single tooth of the ring gear.

18. The smart motor according to claim 16, further comprising a connection interface connecting a DC high voltage power supply bus to each of the six arms of the inverter of the electronic control unit, the connection interface including a capacitive decoupling stage equipped with differential mode capacitors.

19. The smart motor according to claim 16, wherein the synchronous machine comprises a plurality of stators and a rotor common to the plurality of stators, each stator being magnetically and electrically independent of the others.

20. The smart motor according to claim 16, wherein the synchronous machine comprises at least four stators and first and second rotors, the first rotor being common to the stators of a first set of at least two stators, the second stator being common to the stators of a second set of at least two stators, the stators of the first set being distinct from the stators of the second set and each stator being magnetically and electrically independent from the others.

* * * * *